United States Patent
Honkanen et al.

(10) Patent No.: US 11,130,136 B2
(45) Date of Patent: Sep. 28, 2021

(54) SYSTEMS AND METHODS TO ENHANCE CONSISTENCY OF ASSAY PERFORMANCE

(71) Applicant: Aushon Biosystems, Inc., Billerica, MA (US)

(72) Inventors: Peter Honkanen, Concord, MA (US); Scott Douglas, Exeter, RI (US); Travis Sullivan, Chelmsford, MA (US); Scott Orencole, Newburyport, MA (US)

(73) Assignee: Aushon Biosystems, Inc., Billerica, MA (US)

( * ) Notice: Subject to any disclaimer, the term of this patent is extended or adjusted under 35 U.S.C. 154(b) by 0 days.

(21) Appl. No.: 13/677,113

(22) Filed: Nov. 14, 2012

(65) Prior Publication Data

US 2013/0142710 A1    Jun. 6, 2013

Related U.S. Application Data

(60) Provisional application No. 61/559,470, filed on Nov. 14, 2011.

(51) Int. Cl.
*B01L 3/00* (2006.01)
*B01J 19/00* (2006.01)

(52) U.S. Cl.
CPC .......... *B01L 3/5085* (2013.01); *B01J 19/0046* (2013.01); *B01J 2219/00315* (2013.01);
(Continued)

(58) Field of Classification Search
CPC .......... B01L 3/00; B01L 3/508; B01L 3/5085; B01L 2200/00; B01L 2200/14; B01L 2200/148; B01L 2300/00; B01L 2300/06; B01L 2300/0627; B01L 2300/0636; B01L 2300/08; B01L 2300/0809;
(Continued)

(56) References Cited

U.S. PATENT DOCUMENTS

| 5,395,754 A | 3/1995 | Lambotte et al. |
| 6,626,939 B1 | 9/2003 | Burnside et al. |

(Continued)

FOREIGN PATENT DOCUMENTS

| CN | 101208422 A | 6/2008 |
| EP | 0 942 283 A2 | 9/1999 |

(Continued)

OTHER PUBLICATIONS

International Search Report and Written Opinion for International Application No. PCT/US12/65039 dated Feb. 1, 2013. 22 pages.
(Continued)

*Primary Examiner* — Samuel P Siefke
(74) *Attorney, Agent, or Firm* — Wolf, Greenfield & Sacks, P.C.

(57) ABSTRACT

Systems and methods are disclosed for enhancing the consistency of performance of assays, such as multiplexed assays, by printing features in a particular pattern, such that the outer edge of the pattern has a shape that is substantially similar to the shape of the test well. For example, the pattern is a ring pattern, such that the outer edge of the ring pattern is circular or oval along the bottom of multiplexed wells. The assay substrates prepared according to the methods described result in more accurate, precise, and sensitive chemical and/or biological analyses.

27 Claims, 4 Drawing Sheets

(52) U.S. Cl.
CPC ............... *B01J 2219/00317* (2013.01); *B01J 2219/00662* (2013.01); *B01J 2219/00693* (2013.01); *B01L 2200/148* (2013.01); *B01L 2300/0636* (2013.01); *B01L 2300/0829* (2013.01)

(58) Field of Classification Search
CPC .......... B01L 2300/0829; B01J 19/0046; B01J 2219/00315; B01J 2219/00662; B01J 2219/00693; B01J 2219/00317; C40B 20/04; C40B 40/10; C40B 50/14
See application file for complete search history.

(56) References Cited

U.S. PATENT DOCUMENTS

| | | |
|---|---|---|
| 7,455,816 B2 | 11/2008 | Steuer et al. |
| 8,020,571 B2 | 9/2011 | Honkanen et al. |
| 8,055,452 B2 | 11/2011 | Bevilacqua et al. |
| 8,246,760 B2 | 8/2012 | Honkanen et al. |
| 8,541,246 B2 | 9/2013 | Bunce et al. |
| 8,679,262 B2 | 3/2014 | Honkanen et al. |
| 8,685,486 B2 | 4/2014 | Oliver et al. |
| 8,811,704 B2 | 8/2014 | Honkanen et al. |
| 2001/0055760 A1 | 12/2001 | Chechik |
| 2002/0064482 A1 | 5/2002 | Tisone et al. |
| 2002/0064774 A1 | 5/2002 | Schembri et al. |
| 2002/0106661 A1 | 8/2002 | Virtanen |
| 2003/0133838 A1 | 7/2003 | Eichenlaub |
| 2003/0198967 A1 | 10/2003 | Matson et al. |
| 2004/0049351 A1 | 3/2004 | Matson et al. |
| 2004/0058327 A1 | 3/2004 | Pan et al. |
| 2004/0121334 A1 | 6/2004 | Wei et al. |
| 2004/0229226 A1 | 11/2004 | Reddy et al. |
| 2004/0265923 A1 | 12/2004 | Gilmore et al. |
| 2005/0074898 A1 | 4/2005 | Datwani et al. |
| 2005/0281857 A1 | 12/2005 | Heyer et al. |
| 2006/0032747 A1 | 2/2006 | Anderson et al. |
| 2006/0062693 A1 | 3/2006 | Muraishi |
| 2006/0189123 A1 | 8/2006 | Saitou et al. |
| 2006/0292586 A1 | 12/2006 | Schroth et al. |
| 2007/0020711 A1 | 1/2007 | Wheat |
| 2007/0184494 A1 | 8/2007 | McBride et al. |
| 2007/0259366 A1 | 11/2007 | Lawrence et al. |
| 2008/0015116 A1 | 1/2008 | Bass et al. |
| 2008/0032261 A1 | 2/2008 | Novak et al. |
| 2008/0032281 A1 | 2/2008 | Lea et al. |
| 2008/0073511 A1 | 3/2008 | Svatos et al. |
| 2008/0085556 A1 | 4/2008 | Graefing et al. |
| 2008/0213481 A1 | 9/2008 | Caracci et al. |
| 2008/0227663 A1 | 9/2008 | Tisone et al. |
| 2008/0254448 A1 | 10/2008 | Ginot et al. |
| 2008/0269075 A1 | 10/2008 | Lea et al. |
| 2009/0101175 A1 | 4/2009 | Honkanen et al. |
| 2009/0131263 A1 | 5/2009 | Dong |
| 2009/0137428 A1 | 5/2009 | Okabe et al. |
| 2009/0163374 A1 | 6/2009 | Pawlak et al. |
| 2009/0280649 A1 | 11/2009 | Mayer et al. |
| 2010/0047845 A1 | 2/2010 | Woodside et al. |
| 2010/0075864 A1 | 3/2010 | Prechl et al. |
| 2010/0093557 A1 | 4/2010 | Kumble |
| 2010/0297779 A1 | 11/2010 | Canva |
| 2011/0027914 A1 | 2/2011 | Bunce et al. |
| 2011/0243411 A1 | 10/2011 | Weiner et al. |
| 2012/0000493 A1 | 1/2012 | Honkanen et al. |
| 2012/0135154 A1 | 5/2012 | Oliver et al. |
| 2013/0034284 A1 | 2/2013 | Honkanen et al. |
| 2013/0061880 A1 | 3/2013 | Honkanen et al. |
| 2013/0266969 A1 | 10/2013 | Honkanen et al. |
| 2014/0134652 A1 | 5/2014 | Honkanen et al. |
| 2018/0120310 A1 | 5/2018 | Honkanen et al. |

FOREIGN PATENT DOCUMENTS

| | | |
|---|---|---|
| JP | 2006-090718 A | 4/2006 |
| JP | 2006-343270 A | 12/2006 |
| JP | 2007-505326 A | 3/2007 |
| JP | 2008-527333 A | 7/2008 |
| JP | 2009-519450 A | 5/2009 |
| JP | 2009-263353 A | 11/2009 |
| JP | 2012-514184 A | 6/2012 |
| WO | WO-03/012390 A2 | 2/2003 |
| WO | WO 2004/104230 A1 | 12/2004 |
| WO | WO 2010/075632 A1 | 7/2010 |
| WO | WO-2012/068372 A1 | 5/2012 |

OTHER PUBLICATIONS

Perrin, ILISA: Immuno-Linked Sorbent Arrayfor protein detection and quantification, BioAnalytica. München, Germany, (Published Apr. 1-4, 2003).

Bufflier, OLISA Micro Arrays : Fast, Reliable and Competitive Method for Genotyping, Lab-on-a-Chip and Microarrays: Discovery to Development. Zurich, Switzerland, (Published Feb. 13-14, 2003).

Sauvaigo et al., An Oligonucleotide Microarray for the Monitoring of Repair Enzyme Activity Toward Different DNA Base Damage, Anal Bioanal Chem, 333:182‐92 (Published 2004).

Perrin, et al., A Combined Oligonucleotide and Protein Microarray for the Codetection of Nucleic Acids and Antibodies Associated with Human Immunodeficiency Virus, Hepatitis B Virus . . . Infections, Anal Bioanal Chem, 322:148-55 (Published 2003).

Bufflier, Dedicated OLISA Biochipsfor Multiple GMO Detection and Identification, AgroGene XIIth seminar: GMOs: after the moratorium-Safety, acceptability, tracability and potential, Paris, France, Feb. 26-27, 2004.

European Search Report dated May 24, 2016, in European application No. 12849449.9, 7 pages.

Sauvaigo et al., "An oligonucleotide microarray for the monitoring of repair enzyme activity toward different DNA base damage," Analytical Biochemistry, Oct. 1, 2004, vol. 333, No. 1, pp. 182-192.

Response mailed Nov. 20, 2018 to Office Communication dated Jul. 16, 2018 in EP App. No. 12849449.9 and amended claims.

Office Communication for EP App. No. 12849449.9 dated Jan. 2, 2019 and claims pending.

[No Author Listed], SurModics Protein Stability Solutions: an Overview of Products for In Vitro Applications. SurModics. Eden Prairie, MN. 2005:10 pages.

Alexandre et al., Compact Disc with Both Numeric and Genomic Information as DNA Microarray Platform. BioTechniques. Aug. 2002;33(2):435-9.

Chen et al., Nucleic Acid Microarrays created in the double-spiral format on a circular microfluidic disk. Lab on a Chip. 2008;8:826-9. Epub Mar. 11, 2008.

Hartmann et al., Increasing robustness and sensitivity of protein microarrays through microagitation and automation. Analytica Chimica Acta. 2006;564:66-73.

Hartmann et al., Non-contact protein microarray fabrication using a procedure based on liquid bridge formation. Anal Bioanal Chem. 2009;393:591-8.

Kido et al., Disc-based immunoassay microarrays. Analytica Chimica Acta. 2000;411:1-11.

Ling et al., Multiplexing Molecular Diagnostics and Immunoassays Using Emerging Microarray Technologies. Expert Review of Molecular Diagnostics, Future Drugs. Jan. 1, 2007;7(1):87-98.

Matthiessen, Evolution Airbrush Instructions for Use. Harder & Steenbeck GmbH & Co. KG. Norderstedt, Germany. Jan. 1, 2009:37 pages.

Posthuma-Trumpie et al., Lateral flow (immuno)assay: its strengths, weaknesses, opportunities and threats. A literature survey. Analytical and Bioanalytical Chemistry. Jan. 2009;393(2):569-82.

Office Communication for EP App. No. 19202779.5 dated Dec. 3, 2020 and Claims Pending.

Final Office Action for U.S. Appl. No. 15/852,939 dated Apr. 29, 2020 and Claims Pending.

[No Author Listed], Aushon Launches Cira™ Multiplex Protein Biomarker Platform, Achieving ELISA-Level Performance in a Multiplex Format. Aushon BioSystems. Press Release. Jun. 21, 2012. 3 pages.

(56) References Cited

OTHER PUBLICATIONS

[No Author Listed], Aushon BioSystems and ABL, Inc. Announce Adoption of the Cira™ Platform for Multiplex and Ultrasensitive Biomarker Testing. Business Wire. Press Release. Sep. 26, 2017. 3 pages.

Pereiro et al. Shake It or Shrink It: Mass Transport and Kinetics in Surface Bioassays Using Agitation and Microfluidics. Anal Chem. Jun. 9, 2020;92(15):10187-95. https://doi.org/10.1021/acs.analchem.0c01625.

Tobos et al. Sensitivity and binding kinetics of an ultra-sensitive chemiluminescent enzyme-linked immunosorbent assay at arrays of antibodies. J Immunol Methods. Nov. 2019;474:112643. https://doi.org/10.1016/j.jim.2019.112643

Extended European Search Report for EP App. No. 19202779.5, dated Mar. 2, 2020 and Pending Claims.

SYSTEMS AND METHODS TO ENHANCE CONSISTENCY OF ASSAY PERFORMANCE

CROSS-REFERENCE TO RELATED APPLICATIONS

This application claims the benefit under 35 U.S.C. § 119(e) of U.S. Provisional Patent Application No. 61/559,470, filed on Nov. 14, 2011, which is incorporated by reference herein in its entirety.

BACKGROUND

Field of Invention

The present inventions relate to systems and methods for enhancing the consistency of assay performance, including preparation of assay substrates.

Description of Related Art

An assay substrate is a surface upon which various chemical and/or biological analyses can be performed. Examples of an assay substrate include microarray plates, glass slides, and microtiter plates. A microtiter plate is a flat plate that has multiple "wells" formed in its surface. Each well can be used as a small test tube into which various materials can be placed to perform biochemical analyses. One illustrative use of microtiter plates includes an enzyme-linked immunosorbent assay (ELISA), which is a modern medical diagnostic testing technique.

Generally, in an ELISA, a capture antibody is printed in the bottom of a well in a microtiter plate. The capture antibody has specificity for a particular antigen for which the assay is being performed. A sample to be analyzed is added to the well containing the capture antibody, and the capture antibody "captures" or immobilizes the antigen contained in the sample. A detect antibody is then added to the well, which also binds and/or forms a complex with the antigen. Further materials are then added to the well which cause a detectable signal to be produced by the detect antibody. For example, when light of a specific wavelength is shone upon the well, the antigen/antibody complexes will fluoresce. The amount of antigen in the sample can be inferred based on the magnitude of the fluorescence. In another example, a compound can be added to the well that causes the detect antibody to emit light within a predetermined wavelength (e.g., 400-500 nm). This light can be read by a charged-coupled device (CCD) camera to measure the optical brightness of the emitted light.

During an ELISA, the absorbency, fluorescence, or electrochemical signal of the well can be measured and compared with a standard to more accurately determine the presence and quantity of the sample antigen. For example, a calibration feature with a known concentration of antigen can be placed in wells separate from the wells that receive antigen-containing patient samples. However, signal variability, such as fluorescence variability, and well-to-well variability in the separate wells can decrease the accuracy and reliability of test results. A need exists for methods and systems to provide and improve accuracy, reliability, and sensitivity of medical diagnostic testing techniques and other biochemical analyses.

DETAILED DESCRIPTION

This disclosure relates to systems and methods to enhance the consistency of performance of assays, such as multiplexed assays, by printing analysis features along the bottom of the well in a pattern, such that the outer edge of the pattern has a shape that is substantially similar to the shape of the test well. In one aspect, the disclosure relates to testing substrates that include a substrate material defining at least one well, the well having a bottom surface and at least one side wall, the at least one side wall having a bottom surface and at least one side wall, the at least one side wall having a cross-sectional shape lying in a plane parallel to the bottom surface; and at least one set of analysis features disposed on the bottom surface in a pattern, the pattern having a shape that is substantially similar to the cross-sectional shape of the at least one side wall. In some embodiments, the pattern of the features is non-rectangular. In some embodiments, the pattern is oval or circular. In some embodiments, the pattern has multiple rings. In other embodiments, the substrate further includes at least one calibration feature printed onto the analysis features, wherein the calibration feature has one or more known concentrations of a compound that binds to the analysis features; and at least one additional analysis feature in the same well of the testing substrate.

The disclosed systems and methods increase the detection capabilities of a biochemical assay. The disclosed systems and methods also increase assay throughput and reduce processing time for running experiments and analyses, as fewer assays must be run because of the increased consistency of performance of the assays. The systems and methods reduce the inaccuracy that can result from signal variability and day-to-day variability. Embodiments of the inventions increase the throughput and efficiency of all biochemical analyses (for example, ELISAs) where the output signal is related to light intensity. Suitable samples for use in assays and other biochemical analyses include, but are not limited to, samples from, for example, cell lysates, cell supernatants, plasma, serum, and other biological fluids.

Conventionally, feature patterns are printed on the bottom of wells in a grid format, such as a rectangular or square pattern. However, one problem with such an approach is that each of the features in the well do not interact in the same manner with the fluid presented in the well due to several circumstances. First, the meniscus effect causes this lack of equivalent interaction. The meniscus is the curve in the upper surface of a liquid close to the surface of a container, such as a test well, and is caused by surface tension. Because of the geometry of the test well, a meniscus forms. Second, when a test plate is static, the volume of fluid remains relatively uniform. However, test plates are often dynamic. Plates are moved when transferred from one place to another during experimentation. Also, plates can be placed on various laboratory equipment, including stir plates. When a plate is shaken or moved, fluid is swirled, which accentuates the meniscus effect. Thus, features in a well are not exposed to the same amount of fluid.

The disclosed systems and methods enhance the consistency of assays by printing features in a pattern that takes into account the factors discussed herein that lead to features not being exposed to the same amount of fluid. In some embodiments, the features are printed in a pattern such that the outer edge of the pattern has a shape that is substantially similar to the shape of the test well. In some embodiments, the pattern of the features is non-rectangular. In some embodiments, the pattern is oval or circular. In other embodiments, the pattern has multiple rings.

The disclosed systems and methods result in assays with increased sensitivity, accuracy, and precision. "Sensitivity" is the ability to detect clinically important but very low levels of, for example, an antibody. The "sensitivity" of an assay can be evaluated by diluting known positive samples sequentially and determining the dilution at which the reaction is lost. Test samples often have low amounts of analyte, and the disclosed systems and methods allow detection of an analyte even with low test samples. The "accuracy" of an assay refers to the ability to measure the quantity of the substance in a test sample to that quantity's actual (true) value. "Precision" refers to the ability of the assay to consistently reproduce a result; it is the degree to which repeated measurements under unchanged conditions show the same results. Intra-assay and inter-assay precision are two distinct measures of this precision.

In a conventional two-dimensional grid pattern, a coefficient of variation (CV) ranges from about 12% to about 15%. The variability of biochemical assays is often summarized by the CV, which is defined as the standard deviation (SD) divided by the mean, with the result often reported as a percentage. One reason to use CV is that the SDs of such assays generally increase or decrease proportionally as the mean increases or decreases, so that division by the mean removes it as a factor in the variability. The CV is a standardization of the SD that allows comparison of variability estimates regardless of the magnitude of analyte concentration, at least throughout most of the working range of the assay. The disclosed methods and systems produce results with CV ranges of about 5% or less, about 4% or less, about 3% or less, about 2% or less, or about 1% or less.

Figure 1:
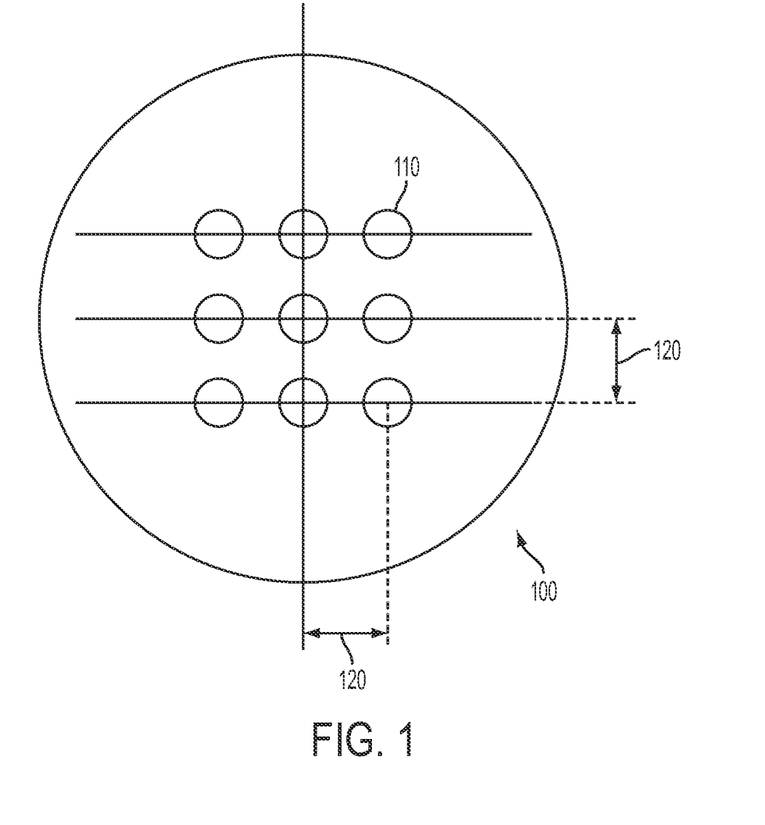
FIG. 1 shows an assay well with analysis features arranged in a conventional grid array pattern.

FIG. 1 shows a top view of an assay well with features arranged in a conventional grid array pattern. FIG. 1 is a top view of one well 100 in, for example, a microtiter-based platform. In one illustrative implementation, the well substrate is formed of a polystyrene base. Other potential substrate materials include, but are not limited to, nitrocellulose, glass, and other plastic materials. During the preparation of a microtiter plate for use in biochemical analysis, many different analysis "features" 110, including capture antibody features or analyte features, are printed in the well and adhere to the polystyrene base of the well. As used herein, "features" can have different shapes, such as, for example, a rounded shape. The assay substrate can be, for example, a 96-well or 384-well microtiter plate. The diameter of each of the features can be, for example, about 250 μm to about 800 μm in diameter, from about 350 μm to about 700 μm, to about 600 μm. In one example, the CV for a 3×3 9 Plex IL-6 array with a conventional grid pattern is 14.0%. The distance 120 from a center of one analysis feature to a center of an adjacent analysis feature ranges from about 909 μm to about 1100 μm, to about 1050 μm. The diameter of well 100 ranges from about 5000 μm to about 7000 μm, to about 6580 μm.

Figure 3:
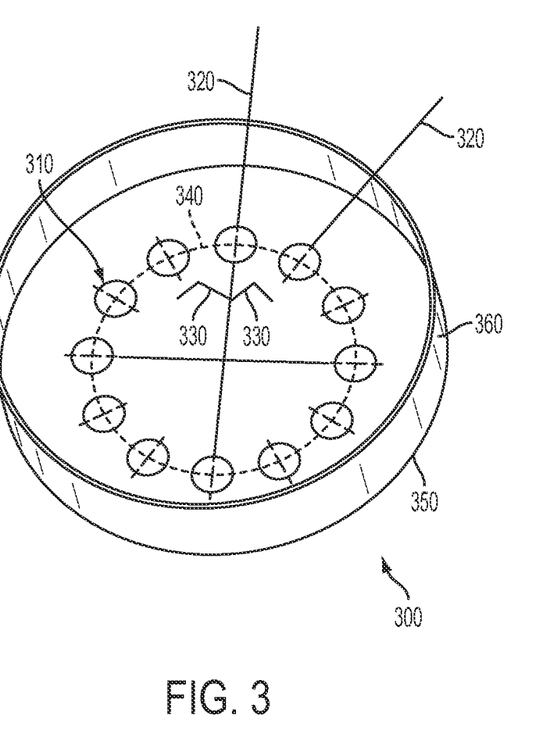
FIG. 3 shows an assay well with analysis features arranged in a ring pattern, such that the outer edge of the ring pattern is circular, in accordance with some embodiments.

The disclosed methods and systems produce results with CV ranges of about 5% or less. FIG. 3 shows a top view of an assay well 300 with features 310 arranged in a ring pattern 340, wherein an outer edge of the ring pattern is circular, in accordance with some embodiments. The well 300 has a bottom surface 350 and a side wall 360. In some embodiments, one assay well has a range of 8 to 16 analysis features, 10 to 14 features, to 12 features. In FIG. 3, there are 12 analysis features 310 in a ring pattern 340, wherein an outer edge of the ring pattern is circular. Using a 8-plex IL-6 array with a ring pattern as shown in FIG. 3, the CV was tested to be only 2.4%, a more than 5-fold improvement over conventional grid patterns. In one embodiment, the features are printed in a circular pattern, such that the radial distance from the center of the feature to the center of the well is substantially the same for each feature. In some embodiments, the diameter of the well 300 ranges from about 1.5 mm to about 6.86 mm, from about 2.4 mm to about 6.4 mm, and is about 6.58 mm. In some embodiments, the angle 330 formed by, for example, lines 320, is about 30°. In some embodiments, the diameter of each of the features can be, for example, about 250 μm to about 800 μm in diameter, about 350 μm to about 700 μm, to about 600 μm. In some embodiments, the radius of the circle 340 is about 1 to about 3 mm, about 1.5 to about 2.5 mm, is about 1.93 mm.

During the preparation of a microtiter plate for use in biochemical analysis, many different analysis "features" 110, including capture antibody features or analyte features, are printed in the well and adhere to the polystyrene base of the well. As used herein, "features" can have different shapes, such as, for example, a rounded shape. The assay substrate can be, for example, a 96-well or 384-well microtiter plate. The diameter of each of the features can be, for example, about 250 μm to about 800 μm in diameter, from about 350 μm to about 700 μm, to about 600 μm. In one example, the CV for a 3×3 9 Plex IL-6 array with a conventional grid pattern is 14.0%. The distance 120 from a center of one analysis feature to a center of an adjacent analysis feature ranges from about 909 μm to about 1100 μm, to about 1050 μm. The diameter of well 100 ranges from about 5000 μm to about 7000 μm, to about 6580 μm.

In some embodiments, The features are far enough from the outer edge of the well so that the features are exposed to approximately the same amount of fluid, taking into account the meniscus effect and the effects of moving the well. In some embodiments, the distance from the edge of the well to the center of the feature is about 10% to about 90% of the radius of the well. In other embodiments, the distance from the edge of the well to the center of the feature is about 20% to about 80%, about 30% to about 70%, about 40% to about 60%, and about 50% of the radius of the well. In some embodiments, an angle, shown as 310, is formed by a first line that extends from the center of one feature to the center of the well and a second line that extends from the center of an adjacent feature to the center of the well, and the angle is substantially the same for each adjacent feature.

Figure 2A:
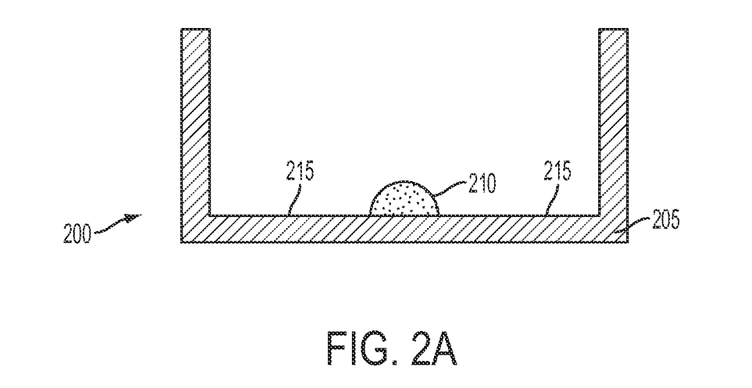
FIGS. 2A-C show a series of cross-sectional side views of a well in a microtiter plate during a known method of conducting an ELISA.
Figure 2B:
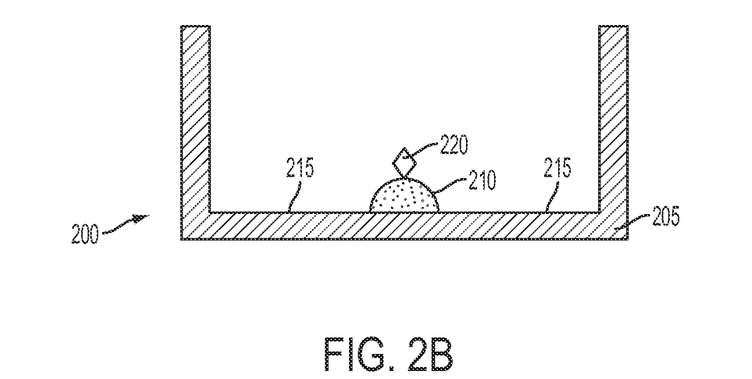
Figure 2C:
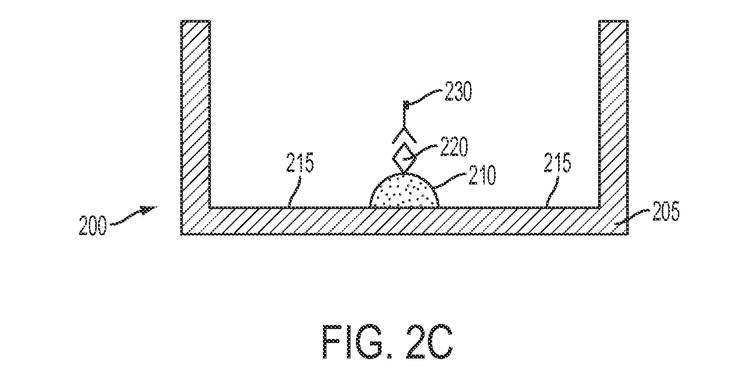

FIG. 2 show a series of cross-sectional side views 200 of a well 205 during a known method of conducting an ELISA. The description of methods of conducting biochemical analyses such as an ELISA using in-well calibration features is described in International Application No. PCT/US2011/061184, entitled *Method of and System for Printing In-Well Calibration Features,* filed on Nov. 17, 2011, and is incorporated by reference herein. Only one feature is shown in FIG. 2A for clarity, but it is understood that embodiments of the inventions include features printed around the bottom of the well, such as in a circular or oval pattern. In some embodiments, after the capture antibody feature 210 has been printed onto the bottom of the well 205, a blocking material is added to the well to block plate binding sites 215 that remain on the plate 200. This prevents non-selective binding of sample antigens to the base of the well during the ELISA, which would give false readings. Second, an antigen-containing sample is added to the well. FIG. 2B shows the antigen 220 binding to the capture antibody feature 210. Third, the well is washed so that unbound antigen is removed. Fourth, enzyme-linked detect antibodies are added. FIG. 2C shows the enzyme-linked detect antibody 230 binding to the antigen 220. The well is then washed so that unbound antibody-enzyme conjugates are removed. Next, a substance is applied which converts the enzyme into a detectable signal, such as a color, fluorescent, or electrochemical signal. Finally, the absorbency, fluorescence, or electrochemical signal of the well is measured and compared with a standard to determine the presence and quantity of the sample antigen. A standard can be generated by printing calibration features with a known concentration of antigen in wells that are separate from or the same as the wells that receive patient samples.

Multiplexed immunoassays include forward-phase techniques, where the target protein is detected by using direct labeling, or sandwich assay techniques, as described above with the ELISA technique, where the target protein is detected using a secondary-labeled antibody. However, the disclosure herein is not limited to forward-phase or sandwich techniques and includes the application of reverse-phase techniques. In reverse-phase arrays, an antigen-containing sample (including but not limited to from cell lines, tissue samples, blood samples, or any other source of proteomic material) is first added to the well, followed by wash steps and the addition of antibodies that are detected.

Figure 4:
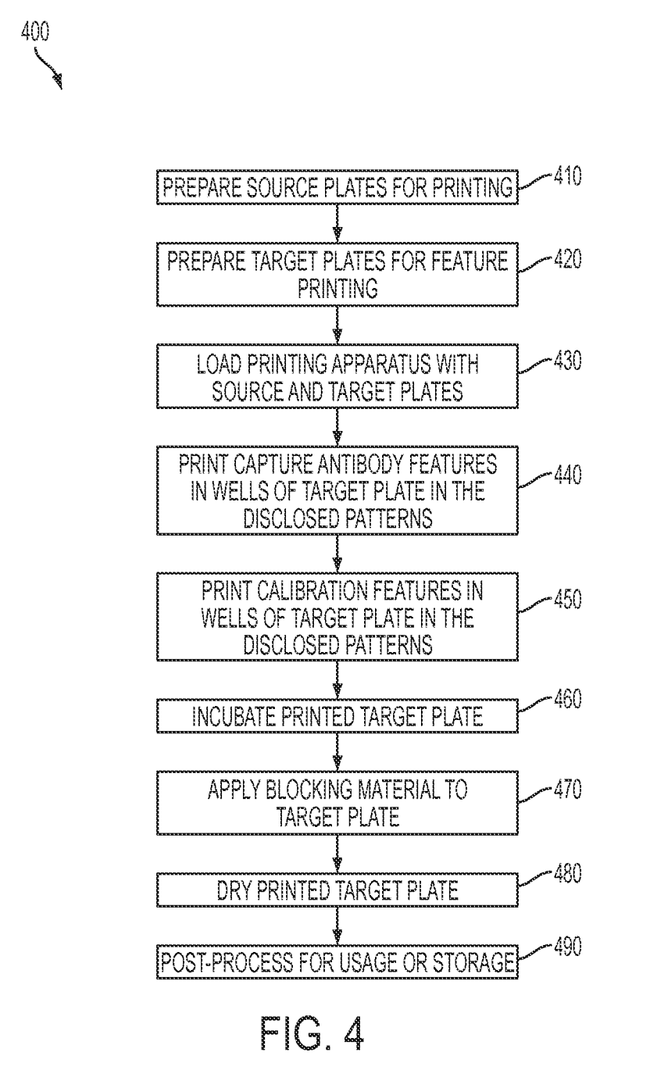
FIG. 4 shows a method of preparing assay substrates with analysis features arranged in a pattern in accordance with some embodiments.

FIG. 4 shows a method 400 of preparing assay substrates in accordance with some embodiments. As discussed herein, although FIG. 4 describes a sandwich assay techniques, the instant disclosure encompasses other assay techniques known in the art, including forward-phase and reverse-phase techniques. In the instant disclosure, by printing features with specific patterns, such as circular or oval patterns, method 400 reduces or eliminates the inaccuracy and imprecision that can result from signal variability and well-to-well variability. Not only does method 400 reduce the variance of assay results, it also increases throughput, as consistency of the assay results reduces the number of times that analyses must be run to obtain accurate and precise results.

As used herein, a "target plate" is a plate that is to be prepared (for example, printed, blocked, and processed for later usage) for a particular set of analyses. A "source plate" is a plate that has a supply of the material to be printed onto a target plate. For example, the wells of a source plate can be filled with various types of antibodies that are to be printed onto target plates. In accordance with method 400, the source plate is prepared for the printing process (step 410). This can include filling the wells of the source plate with the desired material to be printed onto the target plate. Next, the target plate is prepared for printing (step 420). This can include washing and/or performing other surface treatments to enable the material to be printed to properly adhere to the bottom surface of the plate well.

The source and target plates are then fit into a printing apparatus (for example, a 2470 Arrayer available from Aushon Biosystems, Inc. of Billerica, Mass.) (step 430). In some embodiments, capture antibody features are printed in the wells of the target plate according to any of the patterns disclosed herein (step 440). In some embodiments, the outer edge of the pattern has a shape that is substantially similar to the shape of the test well. In some embodiments, the pattern of the features is non-rectangular. In some embodiments, the pattern is oval or circular. In other embodiments, the pattern has multiple rings.

In some embodiments, the features are printed in a circular pattern, such that the radial distance of the center of the feature to the center of the well is substantially the same for each of the features. The features are printed far enough from the edge of the well so that the features are exposed to approximately the same amount of fluid. Although not bound by any theory, the features are spaced from the edge of the well to avoid signal cross talk with non-specific binding occurring at the junction of the well wall and well bottom. The accuracy of automated feature identification and data extraction algorithms is decreased when the features are too close to the well wall—the non-specific binding at the well wall/bottom junction confuses the algorithms, causing the non-specific binding to be identified as the "feature" instead of the actual feature. In some embodiments, the distance from the outer edge of the well to the center of the feature is about 10% to about 90% of the radius of the well. In other embodiments, the distance from the outer edge of the well to the center of the feature is about 20% to about 80%, about 30% to about 70%, about 40% to about 60%, and about 50% of the radius of the well.

Optionally, calibration features with a known concentration of an antigen are precisely printed onto the capture antibody features (step 450). The known concentration of an antigen ranges from the order of femtogram ($10^{-15}$ g) per milliliter to milligram ($10^{-3}$ g) per milliliter. This print step using the load printing apparatus (e.g., the 2470 Arrayer), independent of the pins size of the apparatus, can print the calibration features precisely onto the capture antibody features in the disclosed patterns. In some cases, the positional misalignment between the calibration features and the capture antibody features is about 4 µm or less. Positional misalignments between the calibration features and the capture antibody features of greater than about 4 µm, depending on the size of the features, can also be tolerated. For example, when printing features are in the range of about 120 µm to about 240 µm in diameter, positional misalignment between the calibration features and the capture antibody features of about 10 µm can be tolerated.

In some embodiments, the printed target plate is incubated for a period of time (step 460), and a blocking material, which does not react to the capture antibody, is applied to the target plate using known methods (step 470). The blocking material adsorbs to the remaining binding surfaces of the plate and binds to antigens of non-specific interaction, thus reducing background signal. The printed target plate is then dried (step 480). In one illustrative implementation, a blocking material solution is applied to the surfaces of the bottoms of a plurality of wells in a microtiter plate via a spraying process, as described in U.S. patent application Ser. No. 13,206,775, entitled *Method of and System for Applying Blocking Material to Assay Substrates,* filed on Aug. 10, 2011, the contents of which are incorporated by reference in its entirety.

In some embodiments, the target plate is then processed for usage or storage using known methods (step 490). For example, the target plate can be incubated at about 4° C. overnight. Alternatively, excess blocking material (e.g., the blocking material that has not bound to the bottom of the well) can be removed from the target plate, the plate can then be dried, and then the plate can be placed into a moisture-resistant package for storage. The plates can then be used to conduct chemical and/or biological analyses, such as with an ELISA.

The specific operational parameters provided above are merely illustrative, and other values are within the scope of the inventions.

Kits can be made that incorporate the systems described herein along with any combination of related equipment or reagents, such as reporter reagents or software for reading results of the assay.

The embodiments described above can be used to detect the presence of antigens and proteins in a patient, such as a patient having an autoimmune disease, antibodies to viral diseases, antibodies to bacterial diseases, antibodies to allergic reactions, or antibodies to cancers.

The terms and expressions that are employed herein are terms of description and not of limitation. There is no intention in the use of such terms and expressions of excluding the equivalents of the feature shown or described, or portions thereof, it being recognized that various modifications are possible within the scope of the inventions as claimed.

What is claimed is:

1. A testing substrate for testing a liquid sample, comprising:
   a substrate material defining at least one well, each well having a bottom surface bounded by a peripheral side wall, wherein an entirety of the bottom surface is substantially flat;
   the peripheral side wall having a circular cross-sectional shape when lying in a plane parallel to the bottom surface;
   wherein the bottom surface has an area having a magnitude that is substantially equal to an area of a circle circumscribed by an outer boundary defined by the peripheral side wall; and
   analysis features printed on the bottom surface of the at least one well, wherein each and every analysis feature that is printed in each of the at least one well is disposed in a single circular ring pattern within each well,
   wherein an entirety of the bottom surface surrounding the analysis features is wetted by the liquid sample when present, and
   wherein a distance from a center of each and every analysis feature of each circular ring pattern of each well to a center of the well in which such analysis feature is printed is substantially the same.

2. The substrate of claim 1, further comprising:
   at least one calibration feature printed onto some of the analysis features, wherein the at least one calibration feature has one or more known concentrations of a compound that binds to the analysis features.

3. The substrate of claim 1, wherein the analysis features are arranged such that an angle is formed by a first line that extends from a center of one feature to a center of the well and a second line that extends from a center of an adjacent feature to the center of the well, and wherein the angle is substantially the same for each adjacent feature.

4. The substrate of claim 1, wherein the analysis features are arranged a distance from the outer edge of the at least one well, and wherein the distance from the outer edge of the at least one well to a center of each of the analysis features is about 10% to about 90% of a radius of the at least one well.

5. The substrate of claim 1, wherein the testing substrate is configured to produce a coefficient of variation of about 5% in a biochemical analysis.

6. The substrate of claim 4, wherein the distance is about 20% to about 80% of the radius of the at least one well.

7. The substrate of claim 1, wherein the pattern has 8 to 16 analysis features.

8. The substrate of claim 7, wherein the pattern has 10 to 14 analysis features.

9. The substrate of claim 8, wherein the pattern has 12 analysis features.

10. A method for preparing a testing substrate for testing a liquid sample, comprising:
    determining a cross-sectional shape of a well of a testing substrate, the well having a bottom surface bounded by a peripheral side wall, wherein an entirety of the bottom surface is substantially flat;
    the peripheral side wall having the circular cross-sectional shape when lying in a plane parallel to the bottom surface;
    wherein the bottom surface has an area having a magnitude that is substantially equal to an area of a circle circumscribed by an outer boundary defined by the peripheral side wall; and
    printing analysis features on the bottom surface of the well, wherein each and every analysis feature that is printed in the well is disposed in a single circular ring pattern,
    wherein an entirety of the bottom surface surrounding the analysis features is wetted by the liquid sample when present, and
    wherein the distance from a center of each and every analysis feature that is printed in the well to a center of the well in which such analysis feature is printed is substantially the same.

11. The method of claim 10, further comprising:
    printing at least one calibration feature with one or more known concentrations of a compound that binds to the analysis features in the well,
    wherein the well contains at least one analysis feature that has the at least one calibration feature printed on top, and at least one analysis feature without a calibration feature printed on top.

12. The method of claim 10, wherein the analysis features are arranged such that an angle is formed by a first line that extends from a center of one analysis feature to a center of the well and a second line that extends from a center of an adjacent analysis feature to the center of the well, and wherein the angle is substantially the same for each adjacent analysis feature.

13. The method of claim 10, wherein the analysis features are arranged a distance from the outer edge of the well, and wherein the distance from the outer edge of the well to a center of each of the analysis features is about 10% to about 90% of a radius of the well.

14. The method of claim 13, wherein the distance is about 20% to about 80% of the radius of the well.

15. The method of claim 10 or claim 11, further comprising:
    incubating the testing substrate after the printing step;
    applying blocking material to the testing substrate;
    drying the testing substrate; and
    processing the testing substrate for usage or storage.

16. The method of claim 15, wherein the testing substrate is used to conduct one or more biochemical analyses after the printing step.

17. The method of claim 16, wherein the coefficient of variation of the one or more biochemical analyses is about 5%.

18. The method of claim 17, wherein the one or more biochemical analysis is an enzyme-linked immunosorbent assay.

19. The method of claim 10, wherein the pattern has 8 to 16 analysis features.

20. The method of claim 19, wherein the pattern has 10 to 14 analysis features.

21. The method of claim 20, wherein the pattern has 12 analysis features.

22. A testing substrate for testing a liquid sample, comprising:
- a substrate material comprising a well having a bottom surface bounded by a peripheral side wall, wherein an entirety of the bottom surface is substantially flat;
- wherein the bottom surface has an area having a magnitude that is substantially equal to an area of a circle circumscribed by an outer boundary defined by the peripheral side wall; and
- analysis features printed in a single circular ring pattern on the bottom surface of the well, wherein the circular ring pattern comprises no less than 8 analysis features, wherein a surface inside of the ring pattern has no analysis features or calibration features printed thereon, wherein an entirety of the bottom surface surrounding the analysis features is wetted by the liquid sample when present, and wherein the distance from a center of each of the no less than 8 analysis features printed in the circular ring pattern in the well to a center of the well is substantially the same.

23. The testing substrate of claim 22, wherein the analysis features are arranged a distance from an outer edge of the well, wherein the distance from the outer edge of the well to a center of the each of the analysis features is about 10% to about 90% of a radius of the well.

24. The testing substrate of claim 22, further comprising:
- at least one calibration feature printed onto one or more of the analysis features, wherein the at least one calibration feature has one or more known concentrations of a compound that binds to one or more of the analysis features.

25. The testing substrate of claim 22, wherein the analysis features are arranged such that an angle is formed by a first line that extends from a center of one feature to a center of the well and a second line that extends from a center of an adjacent feature to the center of the well, and wherein the angle is substantially the same for each adjacent feature.

26. The testing substrate of claim 22, wherein the cross-sectional shape, as taken in a plane parallel to the bottom surface of the well, of at least one side wall of the well has a shape that is substantially similar to the ring pattern.

27. A testing substrate for testing a liquid sample, comprising:
- a substrate material comprising a well having a bottom surface bounded by a peripheral side wall, wherein an entirety of the bottom surface is substantially flat, wherein the peripheral side wall has a circular cross-sectional shape when lying in a plane parallel to the bottom surface;
- wherein the bottom surface has an area having a magnitude that is substantially equal to an area of a circle circumscribed by an outer boundary defined by the peripheral side wall; and
- an entirety of analysis features comprising all analysis features printed on the bottom surface of the well, wherein:
  - the entirety of analysis features forms a shape having an outer edge that is circular,
  - at least a portion of analysis features in the entirety of analysis features are arranged in a circular ring pattern having no analysis features or calibration features printed in the inside of the ring pattern,
  - an entirety of the bottom surface surrounding the analysis features is wetted by the liquid sample when present, and
  - a distance from a center of each of the at least a portion of analysis features in the circular ring pattern to a center of the well is substantially the same for each of the at least a portion of analysis features in the ring pattern, wherein the distance is about 1 mm to about 3 mm.

* * * * *